(12) United States Patent
Yao (10) Patent No.: US 10,024,382 B2
(45) Date of Patent: Jul. 17, 2018

(54) APPARATUS FOR DAMPING MACHINING VIBRATIONS

(71) Applicant: ROLLS-ROYCE PLC, London (GB)

(72) Inventor: Shaoming Yao, Sheffield (GB)

(73) Assignee: ROLLS-ROYCE plc, London (GB)

( * ) Notice: Subject to any disclaimer, the term of this patent is extended or adjusted under 35 U.S.C. 154(b) by 126 days.

(21) Appl. No.: 14/925,411

(22) Filed: Oct. 28, 2015

(65) Prior Publication Data

US 2016/0138672 A1  May 19, 2016

(30) Foreign Application Priority Data

Nov. 14, 2014  (GB) .................................. 1420246.9

(51) Int. Cl.
| | |
|---|---|
| *F16F 15/02* | (2006.01) |
| *F16F 15/10* | (2006.01) |
| *F16F 15/14* | (2006.01) |
| *B23Q 3/10* | (2006.01) |

(52) U.S. Cl.
CPC .............. *F16F 15/022* (2013.01); *B23Q 3/10* (2013.01); *F16F 15/02* (2013.01); *F16F 15/10* (2013.01); *F16F 15/1435* (2013.01)

(58) Field of Classification Search
CPC ...... F16F 15/02; F16F 15/022; F16F 15/1435; F16F 15/1442; F16F 15/10; B23Q 3/10
USPC .................................................. 29/557, 558
See application file for complete search history.

(56) References Cited

U.S. PATENT DOCUMENTS

| | | | | | |
|---|---|---|---|---|---|
| 3,838,936 | A | * | 10/1974 | Andreassen | B23B 29/022 188/268 |
| 4,711,423 | A | * | 12/1987 | Popper | F16F 3/0873 248/635 |
| 5,377,772 | A | * | 1/1995 | Gien | E21B 17/073 175/325.5 |
| 6,164,614 | A | | 12/2000 | Lim et al. | |
| 6,902,157 | B2 | * | 6/2005 | Brown | F16F 1/54 248/634 |
| 7,967,282 | B2 | * | 6/2011 | Boyd | F16F 1/38 267/140.13 |
| 8,734,070 | B2 | * | 5/2014 | De Souza Filho | B23B 31/02 408/143 |
| 9,085,057 | B2 | * | 7/2015 | Marshall | B23B 31/305 |

(Continued)

FOREIGN PATENT DOCUMENTS

| | | |
|---|---|---|
| DE | 23 02 732 A1 | 7/1973 |
| DE | 36 32 418 A1 | 3/1988 |

(Continued)

OTHER PUBLICATIONS

Starke et al.; Vibration Damper for Gripping Interior of a workpiece; Apr. 16, 2017; EPO English Machine Translation; pp. 1 and 2.*

(Continued)

*Primary Examiner* — Bayan Salone
(74) *Attorney, Agent, or Firm* — Oliff PLC (57) ABSTRACT

An apparatus for damping machining vibrations includes a first dampener having a viscoelastic material, the first dampener to be inserted into an object defining a cavity therein; and a compressor to compress the first dampener in a first dimension to cause the first dampener to expand in a second dimension to engage an interior wall of the object.

15 Claims, 12 Drawing Sheets

(56) References Cited

U.S. PATENT DOCUMENTS

2005/0039326 A1    2/2005  Wilbert et al.
2010/0164187 A1*   7/2010  Geng .................... B23B 31/305
                                                      279/2.07
2012/0133103 A1    5/2012  Marshall et al.

FOREIGN PATENT DOCUMENTS

| DE | 102 01 925 A1 | | 8/2003 | |
| DE | 102011119098 | * | 5/2013 | ............. B23B 25/00 |
| DE | 102011119098 A1 | | 5/2013 | |
| GB | 1421032 A | | 1/1976 | |
| GB | 2447278 A | | 9/2008 | |
| SU | 1 442 740 A1 | | 12/1988 | |

OTHER PUBLICATIONS

May 18, 2017 Office Action issued in European Patent Application No. 15191856.2.
Apr. 26, 2015 Search Report issued in British Patent Application No. 1420246.9.
May 10, 2016 International Search Report issued in European Patent Application No. 15191856.2.

* cited by examiner

APPARATUS FOR DAMPING MACHINING VIBRATIONS

TECHNOLOGICAL FIELD

The present disclosure concerns apparatus for damping machining vibrations.

BACKGROUND

An object, such as a shaft of a gas turbine engine, may require machining when manufacturing or repairing the object. For example, machining may include holding the object in place while a cutting tool removes a portion of the object to achieve a desired profile. The machining operation may cause the object to vibrate and such vibrations may damage the object, or may result in the object having undesirable features (such as poor surface finish).

BRIEF SUMMARY

According to various, but not necessarily all, embodiments of the invention there is provided apparatus for damping machining vibrations, the apparatus comprising: a first dampener comprising a viscoelastic material, the first dampener to be inserted into an object defining a cavity therein; and a compressor to compress the first dampener in a first dimension to cause the first dampener to expand in a second dimension to engage an interior wall of the object.

The viscoelastic material may comprise silicone rubber.

The first dampener may comprise a plurality of layers of viscoelastic material.

The first dampener may have a circular cross section to engage a cylinder having a corresponding circular cross section.

The first dampener may have an elliptical cross section to engage a cylinder having a corresponding elliptical cross section.

The apparatus may further comprise a rigid member, the first dampener may be provided around at least a part of the rigid member and may be arranged to expand in the second dimension outwardly from the rigid member.

The rigid member may include a rigid cylinder, the first dampener defining an annulus around the rigid cylinder.

The compressor may comprise: first and second pressure members positioned on opposing sides of the first dampener; and an elongate member extending through the first dampener and the first and second pressure members.

The elongate member may comprise a threaded portion, and the compressor may further comprise a nut to engage the threaded portion of the elongate member and to enable the first and second pressure members to compress the dampener.

The apparatus may further comprise: a second dampener comprising a viscoelastic material, the second dampener may to be inserted into the cavity of the object, and the compressor may be arranged to provide pressure to the second dampener in the first dimension to cause the second dampener to expand in the second dimension to engage an interior wall of the object.

The apparatus may further comprise a spacer member between the first dampener and the second dampener, the spacer member may be mounted on the elongate member and being arranged to maintain a predetermined distance between the first dampener and the second dampener.

The apparatus may further comprise an absorber between the first dampener and the second dampener, the absorber may be mounted on the elongate member and may be arranged to absorb vibrations in the elongate member.

The object may be a shaft or a casing of a gas turbine engine.

According to various, but not necessarily all, embodiments of the invention there is provided a method of machining an object, the method comprising: providing an object defining a cavity therein; inserting apparatus as claimed in any of the preceding claims at least partially into the cavity of the object; and controlling the compressor of the apparatus to cause the first dampener to expand in the second dimension to engage the interior wall of the object.

The method may further comprise: causing performance of a machining operation on the object while the apparatus is at least partially positioned within the cavity of the object.

The skilled person will appreciate that except where mutually exclusive, a feature described in relation to any one of the above aspects of the invention may be applied mutatis mutandis to any other aspect of the invention.

BRIEF DESCRIPTION

Embodiments of the invention will now be described by way of example only, with reference to the Figures, in which.

DETAILED DESCRIPTION

In the following description, the terms 'connect', 'couple' and 'abut' mean operationally connected, coupled and abutting. It should be appreciated that there may be any number of intervening components between the mentioned features, including no intervening components.

Figure 1A:
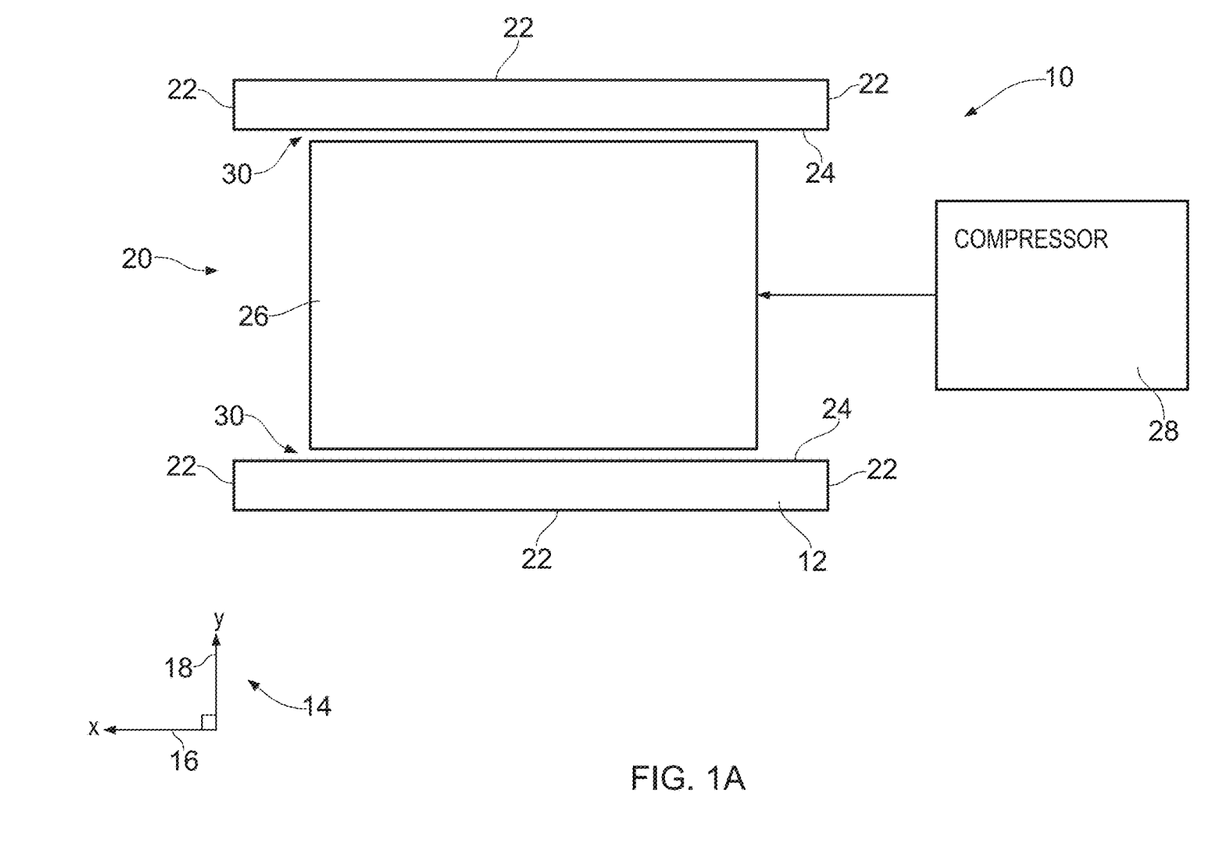
FIG. 1A illustrates a schematic cross sectional diagram of apparatus for damping machining vibrations according to various examples.

FIG. 1A illustrates a schematic cross sectional diagram of apparatus 10 for damping machining vibrations. Additionally, FIG. 1A illustrates an object 12 (which may also be referred to as a 'work piece', and a coordinate system 14 comprising a first dimension (X axis) 16 and a second dimension (Y axis) 18 that are orthogonal to one another. The coordinate system 14 may be any suitable coordinate system and may be a cylindrical coordinate system or a Cartesian coordinate system.

The object 12 may be any suitable object for machining and may be a component of a gas turbine engine such as a shaft or a rotor hub. The object 12 defines a cavity 20 therein and includes an exterior wall 22 (that provides an external surface of the object 12) and an interior wall 24 (that envelopes the cavity 20 and provides an interior surface of the object 12). The cavity 20 extends from the external wall 22 of the object 12 in the X axis 16 and may form a through-hole in the object 12, or may form a blind hole in the object 12.

The apparatus 10 includes a dampener 26 and a compressor 28. The dampener 26 comprises a viscoelastic material (for example, silicone rubber, a polymer, or a rubber). The viscoelastic material of the dampener 26 enables the dampener 26 to expand outwardly in the second dimension 18 when compressed in the first dimension 16. The viscoelastic material may have a hardness Shore A (DIN53505) from 5 to 100° or from 10 to 80°. In an example where the viscoelastic material is silicone rubber, the viscoelastic material may have a shore hardness of 25, a tensile strength of 6.0 MPa, a tear strength of 16.0 N/MM MIN, elongation at break of 350%, and a rebound resilience of 30%.

The dampener 26 is arranged to be inserted into the cavity 20 of the object 12. In particular, when the dampener 26 is uncompressed in the first dimension 16, the dimensions of the dampener 26 are less than the dimensions of the cavity 20 and the dampener 26 is thus able to fit within the cavity 20. Consequently, when the dampener 26 is uncompressed, a gap 30 is defined between the dampener 26 and the interior wall 24 of the object 12.

Figure 9:
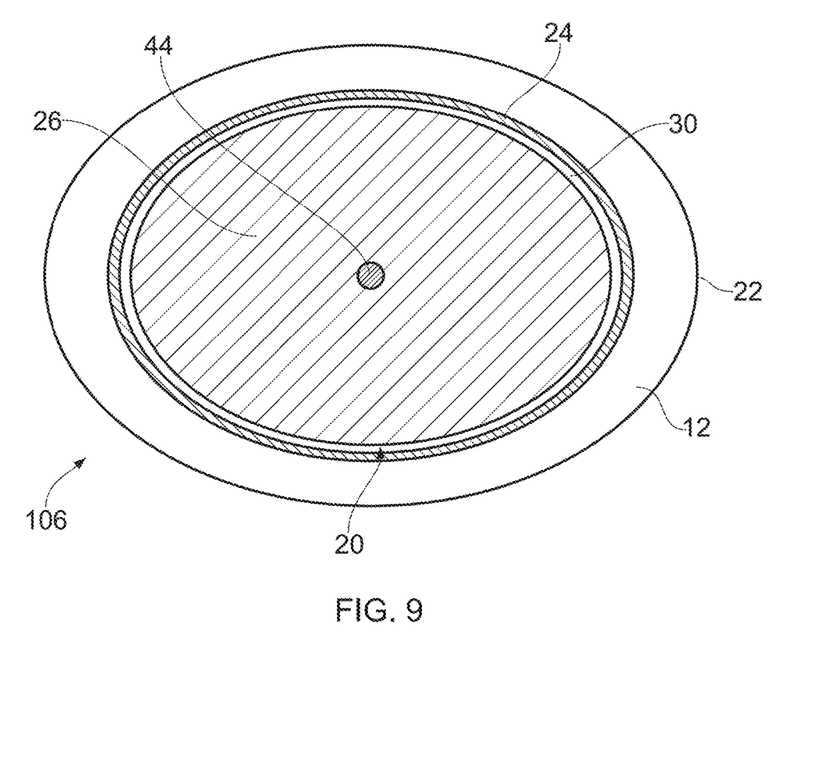
FIG. 9 illustrates a cross sectional front view of a further apparatus for damping machining vibrations according to various examples.

In some examples, the cross sectional shape of the dampener 26 corresponds to the cross sectional shape of the cavity 20. In other words, the dampener 26 may have the same cross sectional shape as the cavity 20 along at least a part of its length. For example, the dampener 26 may have a circular cross sectional shape to correspond to a circular cross sectional shape of the cavity 20. By way of another example, the dampener 26 may have an elliptical cross sectional shape to correspond to an elliptical cross sectional shape of the cavity 20 (as illustrated in FIG. 9).

The compressor 28 may include any suitable device to compress the dampener 26 in the first dimension 16 to cause the dampener 26 to expand in the second dimension 18 to engage the interior wall 24 of the object 12. For example, the compressor 28 may comprise first and second hydraulic presses that are positioned on either side of the dampener 26 to compress the dampener 26 in the first dimension 16. By way of another example, where the cavity 20 is a blind-hole in the object 12, the compressor 28 may comprise a hydraulic press on one side of the dampener 16 that compresses the dampener 16 against an inner wall of the object 12. By way of a further example, the compressor 28 may have the structure illustrated in FIGS. 2 to 11.

Figure 1B:
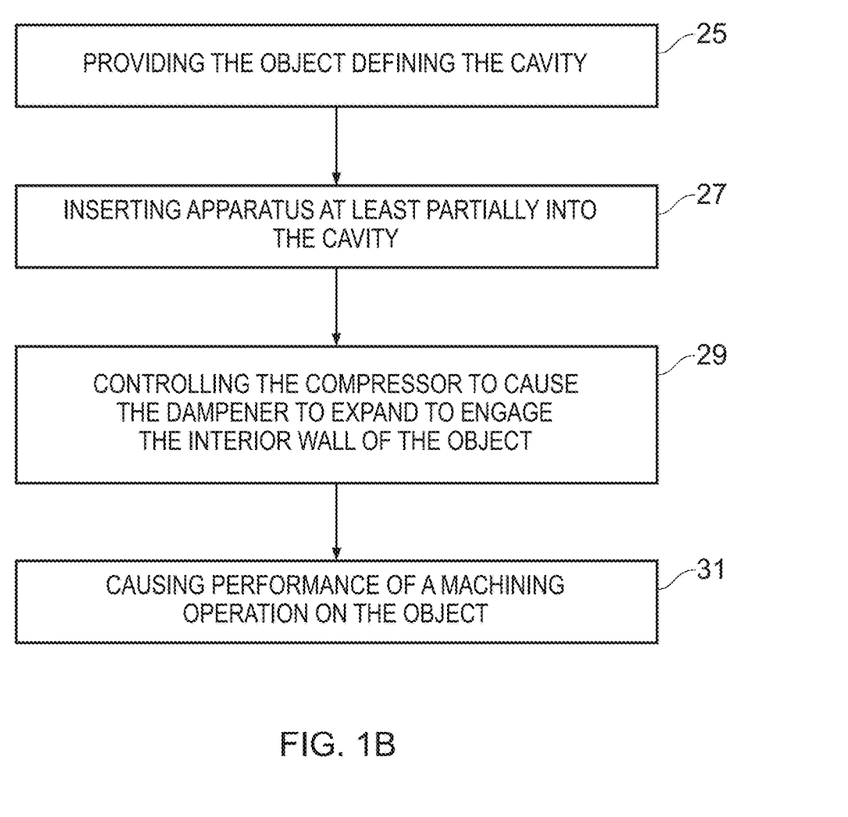
FIG. 1B illustrates a flow diagram of a method of machining an object according to various examples.

FIG. 1B illustrates a flow diagram of a method of machining the object 12 according to various examples. At block 25, the method includes providing the object 12 defining the cavity 20. For example, the object 12 may be provided on a machining table and may, in some examples, be fixed to the machining table via one or more fasteners such as clamps.

At block 27, the method includes inserting the apparatus 10 at least partially into the cavity 20. For example, the apparatus 10 may be inserted into the cavity 20 so that the dampener 26 is at least partially positioned within the cavity 20 of the object 12 and so that the compressor 28 is positioned at least partially outside of the cavity 20 (to provide access to the compressor 28 for a user of the apparatus 10).

At block 29, the method includes controlling the compressor 28 to cause the dampener 26 to expand to engage the interior wall 24 of the object 12. In more detail, the compressor 28 may be controlled so that the dampener 26 expands outwards in the second dimension 18 into the gap 30 and engages the interior wall 24 of the object 12. In some examples, the dampener 26 may engage the interior wall 24 by directly abutting (that is, touching) the interior wall 24. In other examples, the dampener 26 may have a cover and engages the interior wall 24 by pressing the cover into abutment with the interior wall 24.

At block 31, the method includes causing performance of a machining operation on the object 12 while the apparatus 10 is at least partially positioned within the cavity 20 of the object 12 so that dampener 26 dampens machining vibrations in the object 12. For example, a user may control a hand tool to perform a machining operation on the object 12. By way of another example, a user may provide an input to a computer to enable the computer to control a tool to perform a machining operation on the object 12.

The apparatus 10 may provide several advantages. One such advantage is that the apparatus 10 may apply a relatively high pressure to the inner wall 24 of the object 12 (for example, 4 MPa). This may result in a relatively high level of damping and pre-stress on the object 12 and consequently result in machining operations providing an improved finish. Another such advantage is that the apparatus 10 may provide reliable damping of the object 12 because the dampener 26 may expand outwards consistently with repeated compressions of the dampener 26. A further advantage is that the viscoelastic material of the dampener 26 may be self-contained (that is, it may not leak) and may not require a seal. Another advantage is that the apparatus 10 may suppress bending vibrations of the object 12 in addition to vibrations in the surface of the object 12. A further advantage is that the viscoelastic material of the dampener 26 may enable relatively large deformations of the dampener 26 that do not result in causing damage to the dampener 26 (when compared to elastic materials).

Figure 2:
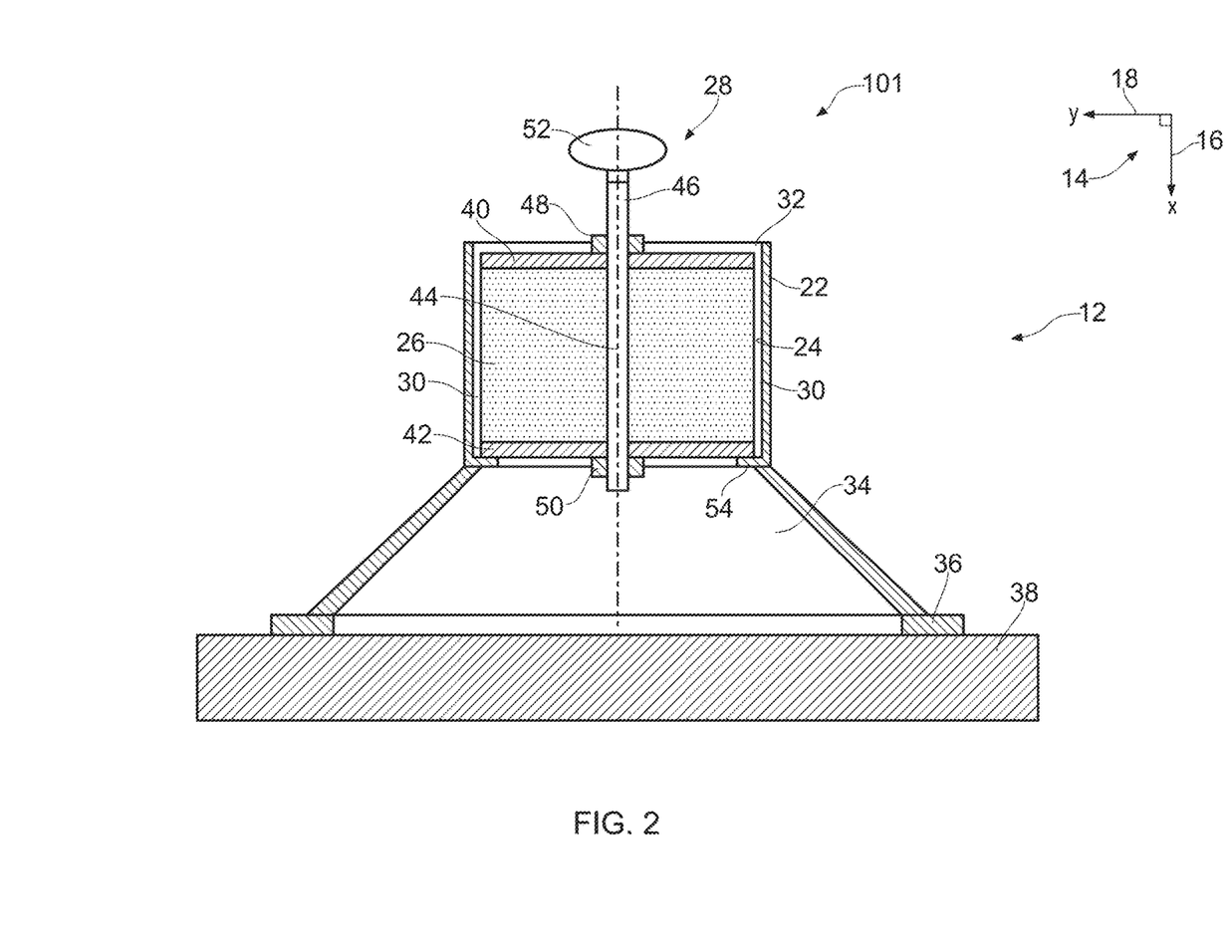
FIG. 2 illustrates a schematic cross sectional diagram of another apparatus for damping machining vibrations according to various examples.

FIG. 2 illustrates a schematic cross sectional diagram of another apparatus 101 for damping machining vibrations. The apparatus 101 is similar to the apparatus 10, and where the features are similar, the same reference numerals are used. FIG. 2 also illustrates a cylindrical coordinate system 14 where the X axis 16 is the longitudinal axis and the Y axis 18 is the polar axis.

The object 12 includes a thin walled cylindrical structure 32 and a conical structure 34 comprising a flange 36. The object 12 is mounted on a machine table 38 via the flange 36 to enable the external wall 22 to be machined.

The compressor 28 includes a first pressure member 40 (which may be a pressure/loading plate or board), a second pressure member 42 (which may be a pressure/loading plate or board), and an elongate member 44 comprising a threaded portion 46, a first nut 48, a second nut 50, and a handle 52.

The first pressure member 40 is positioned adjacent a first side of the dampener 26. The second pressure member 42 is positioned adjacent a second opposing side of the dampener 26 and a flange 54 of the object 12. Thus, the first and second pressure members 40, 42 are displaced from one another in the X axis 16. The first nut 48 is positioned adjacent the first pressure member 40, the second nut 50 is positioned adjacent the second pressure member 42. The elongate member 44 extends through the dampener 26, the first and second pressure members 40, 42, and the first and second nuts 48, 50. The handle 52 is coupled to an end of the elongate member 44 so that a user may rotate the elongate member 44 by rotating the handle 52 (for example, by hand or via a tool).

The first nut 48 is mounted on the threaded portion 46 of the elongate member 44 and is arranged to move in the X axis 16 when the handle 52 is rotated. The second nut 50 is mounted on the elongate member 44 and is arranged to prevent relative movement between the elongate member 44 and the second pressure member 42 in the X axis 16.

In operation, the dampener 26 may be compressed by the compressor 28 by rotating the handle 52 so that the first nut 48 moves in the X direction and presses the first pressure member 40 into the dampener 26. As the dampener 26 is compressed between the first and second pressure members 40, 42, the dampener 26 expands radially outwards in the Y axis 18 into the gap 30 and engagement with the interior surface 24 of the thin walled cylindrical structure 32.

In other examples, the compressor 28 may have an alternative structure. For example, the compressor 28 may not comprise the handle 52, and instead the nut 48 may be rotated using a tool such as a wrench, or alternatively, the nut 48 may be wingnut.

The apparatus 101 may be advantageous in that the compressor 28 may be relatively simple to operate. In particular, vibrations in the object 12 may be dampened by rotating the handle 52 (or by rotating the nut 48, where the compressor 28 does not include the handle 52).

Figure 3:
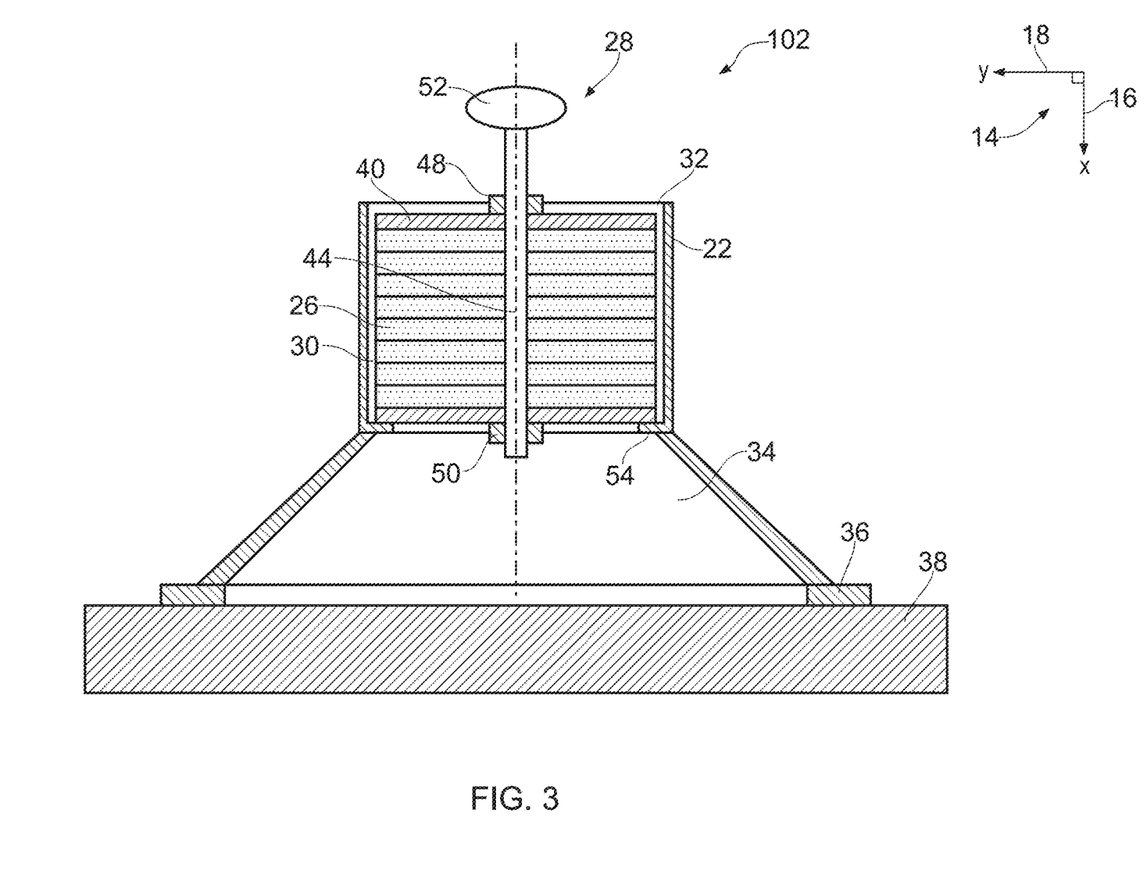
FIG. 3 illustrates a schematic cross sectional diagram of a further apparatus for damping machining vibrations according to various examples.

FIG. 3 illustrates a schematic cross sectional diagram of a further apparatus 102 for damping machining vibrations. The apparatus 102 is similar to the apparatus 101 and where the features are similar, the same reference numerals are used. FIG. 3 also illustrates a cylindrical coordinate system 14 where the X axis 16 is the longitudinal axis and the Y axis 18 is the polar axis.

The apparatus 102 differs from the apparatus 101 in that the dampener 26 comprises a plurality of layers of viscoelastic material. The plurality of layers of viscoelastic material are substantially planar and are oriented parallel to the X axis 16. In other examples, at least some of the plurality of layers of viscoelastic material may be non-planar and at least some of the plurality of layers of viscoelastic material may be oriented at an angle greater than zero degrees relative to the X axis 16.

In some examples, the plurality of layers comprises the same viscoelastic material. In other examples, the plurality of layers comprises different viscoelastic materials along the X axis 16, or may comprise the same viscoelastic material but the properties of the viscoelastic material may vary along the X axis 16. The variance of the viscoelastic material (or the properties of a viscoelastic material) along the X axis 16 may be advantageous in that it may vary the dampening properties of the dampener 26 along the X axis 16.

Figure 4:
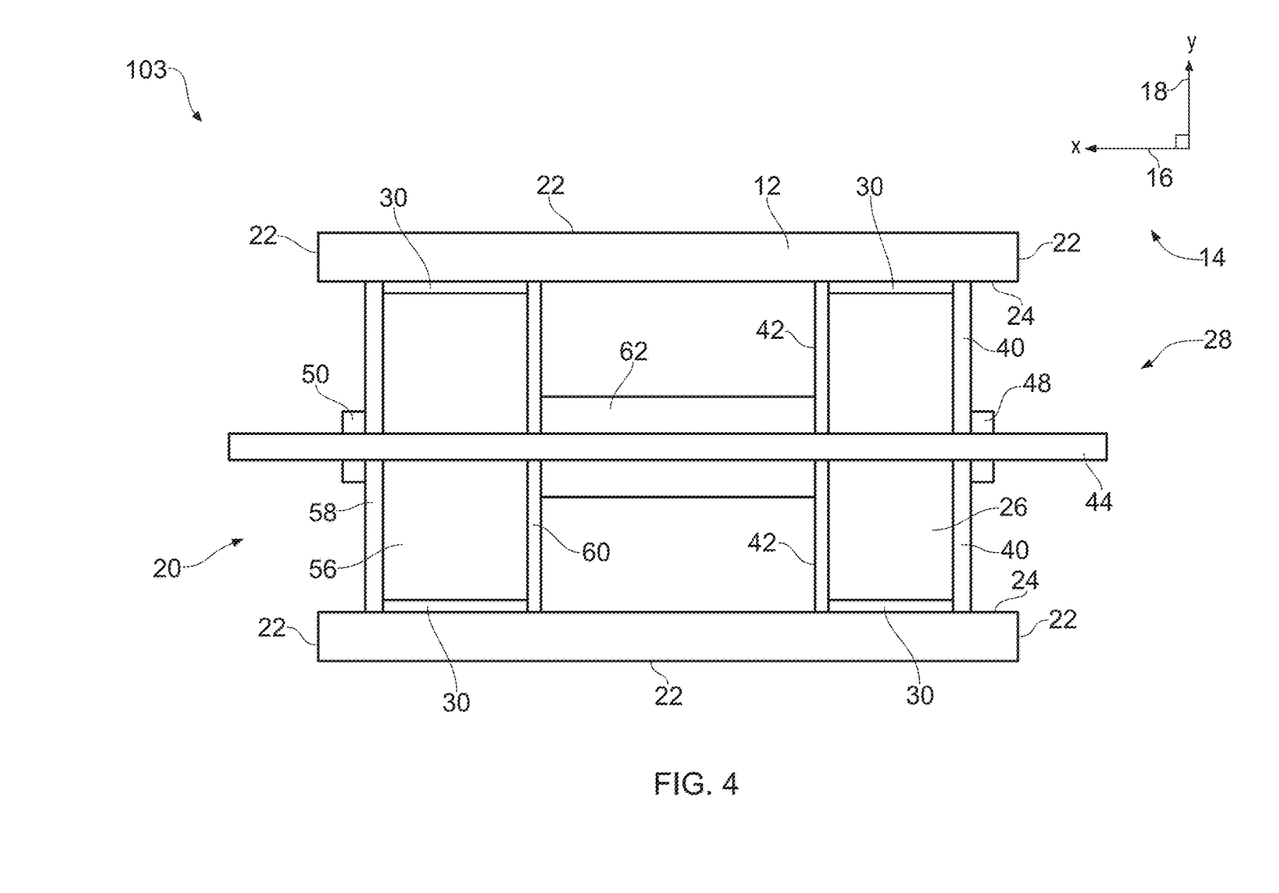
FIG. 4 illustrates a schematic cross sectional diagram of another apparatus for damping machining vibrations according to various examples.

FIG. 4 illustrates a schematic cross sectional diagram of another apparatus 103 for damping machining vibrations. The apparatus 103 is similar to the apparatus 101, 102, and where the features are similar, the same reference numerals are used. FIG. 4 also illustrates a cylindrical coordinate system 14 where the X axis 16 is the longitudinal axis and the Y axis 18 is the polar axis.

The apparatus 103 differs from the apparatus 101, 102 in that the apparatus 103 includes a second dampener 56, a third pressure member 58, a fourth pressure member 60, and a spacer member 62.

The second dampener 56 is similar to the first dampener 26 in that the second dampener 56 is mounted on the elongate member 44 and when uncompressed, defines a gap 30 with the interior wall 24 of the object 12. The compressor 28 is arranged to provide pressure to the second dampener 56 in the X axis 16 to cause the second dampener 56 to expand radially outwards in the Y axis 18 into the gap 30 and to engage the interior wall 24 of the object 12.

The second dampener 56 comprises a viscoelastic material, and may comprise a single layer of viscoelastic material, or a plurality of layers of viscoelastic material(s). The second dampener 56 may comprise the same viscoelastic material(s) as the first dampener 26, or may comprise a different viscoelastic material(s) to the first dampener 26.

The third pressure member 58 is positioned on a first side of the second dampener 56, and the fourth pressure member 60 is positioned on a second opposite side of the second dampener 56. The elongate member 44 extends through the third and fourth pressure members 58, 60 and the second nut 50 is positioned adjacent the third pressure member 58.

The spacer member 62 is positioned between the first dampener 26 and the second dampener 56 (and hence between the second and fourth pressure members 42, 60), and is mounted on the elongate member 44. The spacer member 62 is arranged to maintain a predetermined distance between the first dampener 26 and the second dampener 56 (and a predetermined distance between the second and fourth pressure members 42, 60) by preventing the second and fourth pressure members 42, 60 from moving towards one another. The spacer member 62 may comprise any suitable rigid material and may comprise a metal for example.

In operation, the first nut 48 may be rotated to move the first pressure member 40 in the +X direction to compress the first dampener 26 (and the second dampener 56 via the spacer member 62) and cause the first and second dampeners 26, 56 to engage the interior wall 24 of the object 12. Additionally or alternatively, the second nut 50 may be rotated to move the third pressure member 58 in the −X direction to compress the second dampener 56 (and the first dampener 26 via the spacer member 62) and cause the first and second dampeners 26, 56 to engage the interior wall 24 of the object 12.

The apparatus 103 may advantageously be used to dampen vibrations in relatively long objects due to the length of the first dampener 26, the spacer member 62, and the second dampener 56. Furthermore, the apparatus 103 may advantageously be used in objects having varying cross sectional dimensions. For example, the first dampener 26 may be larger than the second dampener 56 in the Y axis 18 and consequently, the first dampener 26 may be used to dampen vibrations in a wider portion of the object 12 than the second dampener 56.

Figure 5:
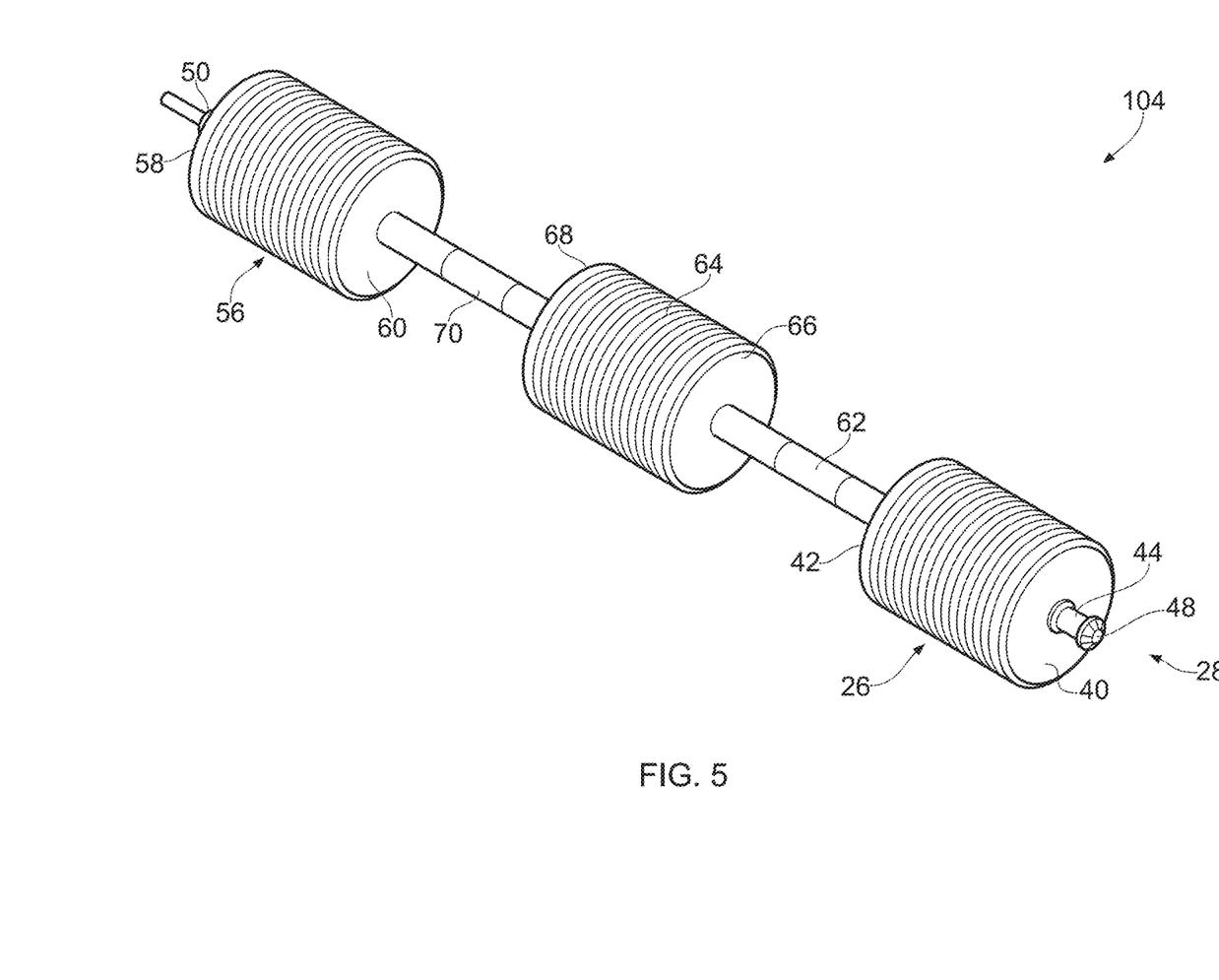
FIG. 5 illustrates a perspective view diagram of a further apparatus for damping machining vibrations according to various examples.
Figure 6:
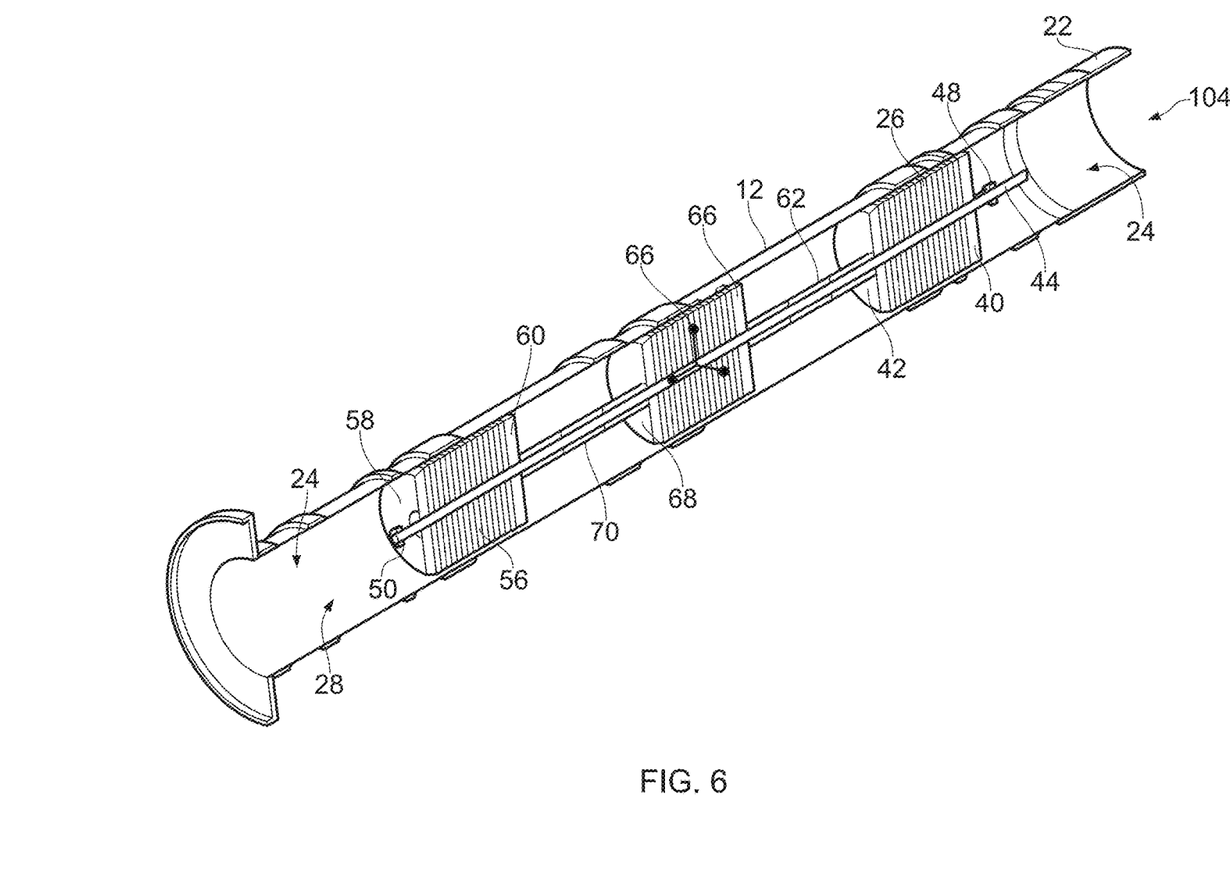
FIG. 6 illustrates a cross sectional perspective view diagram of the apparatus illustrated in FIG. 5.

FIGS. 5 and 6 illustrate a further apparatus 104 for damping machining vibrations. The apparatus 104 is similar to the apparatus 103 and where the features are similar, the same reference numerals are used.

The apparatus 104 differs from the apparatus 103 in that the apparatus 104 additionally includes a third dampener 64, a fifth pressure member 66, a sixth pressure member 68 and a second spacer member 70.

The third dampener 64 is mounted on the elongate member 44 between the first dampener 26 and the second dampener 56. The fifth and sixth pressure members 66, 68 are also mounted on the elongate member 44 and sandwich the third dampener 64. The first spacer 62 is mounted on the elongate member 44 between the first dampener 26 and the third dampener 64. The second spacer member 70 is mounted on the elongate member 44 between the third dampener 64 and the second dampener 56.

Figure 7:
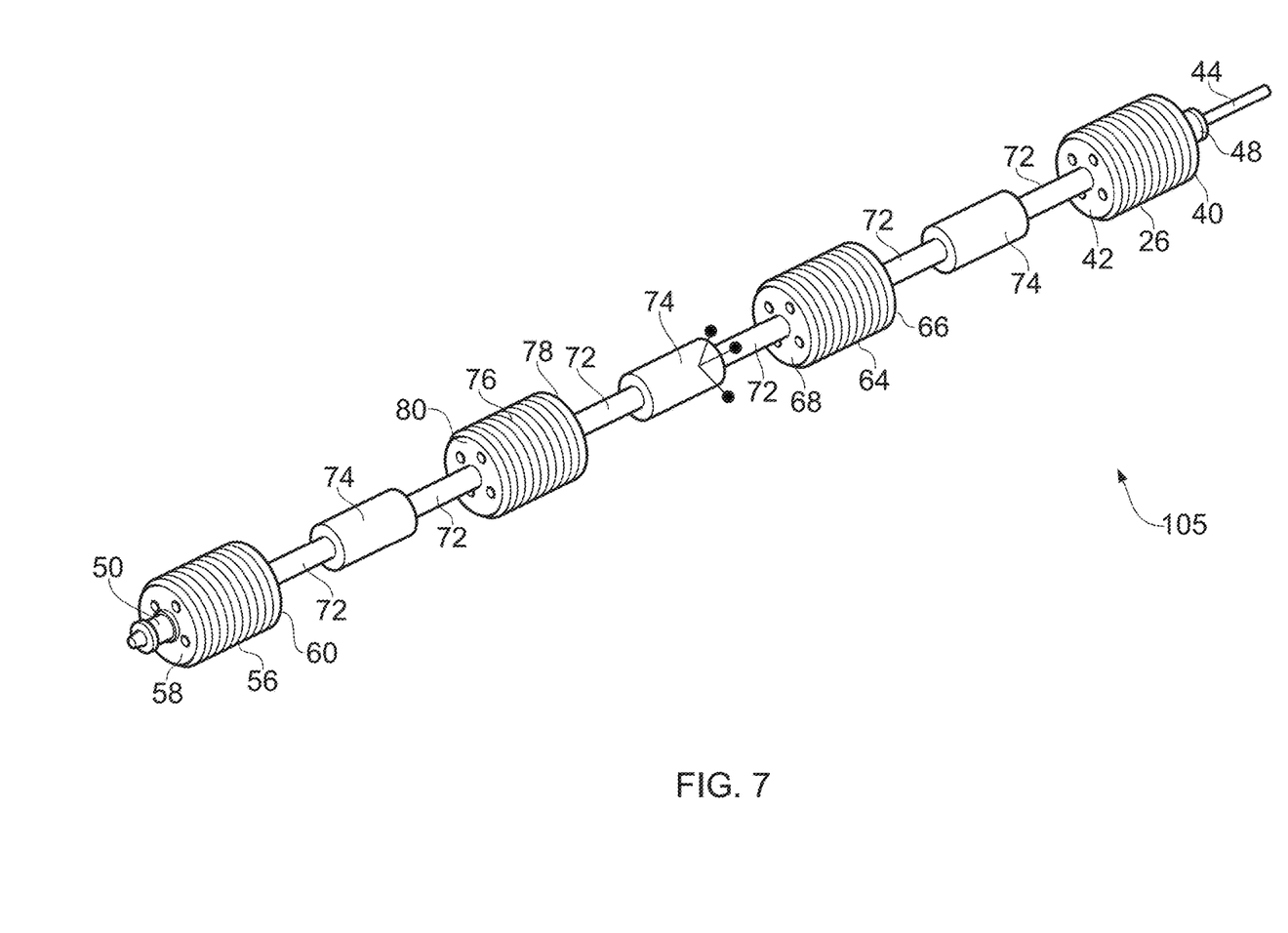
FIG. 7 illustrates a perspective view diagram of another apparatus for damping machining vibrations according to various examples.
Figure 8:
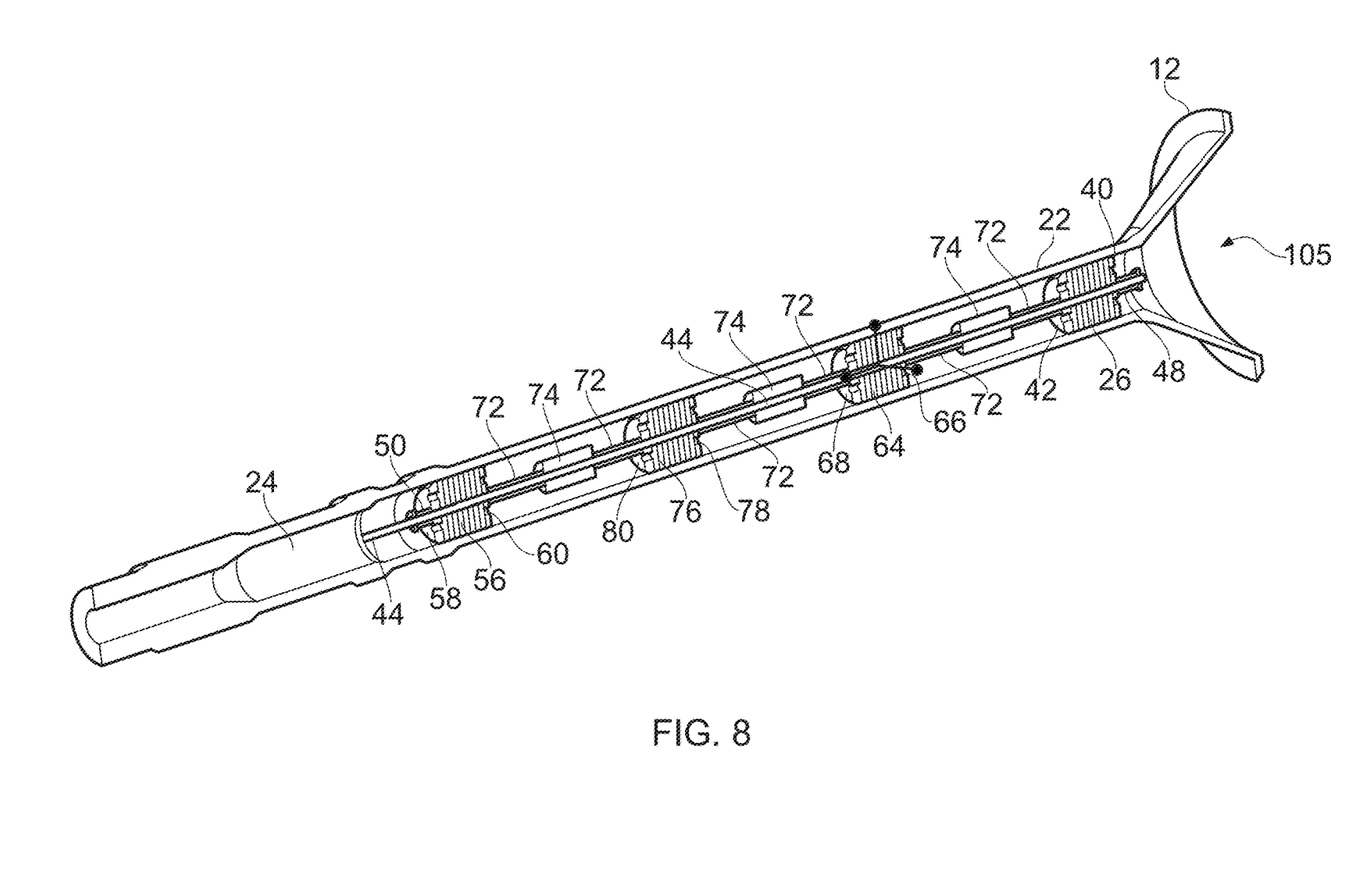
FIG. 8 illustrates a cross sectional perspective view diagram of the apparatus illustrated in FIG. 7.

FIGS. 7 and 8 illustrate another apparatus 105 for damping machining vibrations. The apparatus 105 is similar to the apparatus 104, 103 and where the features are similar, the same reference numerals are used.

The apparatus 105 differs from the apparatus 104 in that the apparatus 105 additionally includes a plurality of spacer members 72, and a plurality of absorbers 74, a fourth dampener 76, a seventh pressure member 78, and an eighth pressure member 80.

The fourth dampener 76 is mounted on the elongate member 44 between the second dampener 56 and the third dampener 64. The seventh and eighth pressure members 78, 80 are also mounted on the elongate member 44 and sandwich the fourth dampener 76. The spacer members 72 are mounted on the elongate member 44 between the pressure members 42, 66, 68, 78, 80, 60 and the absorbers 74.

The plurality of absorbers 74 are mounted on the elongate member 44 between the spacer members 72 (and hence between the dampeners 26, 56, 64, 76). Each of the plurality of absorbers 74 may comprise a solid metal block defining a central aperture for receiving the elongate member 44 there through. The absorbers 74 may be advantageous in that they may absorb vibrations in the elongate member 44 (including bending vibrations in the elongate member 44).

FIG. 9 illustrates a cross sectional front view of a further apparatus 106 for damping machining vibrations. The further apparatus 106 may be similar to any of the apparatus 10, 101, 102, 103, 104, 105. In this example, at least the first dampener 26 has an elliptical cross section that corresponds with the elliptical cross section of the cavity 20 of the object 12. It should be appreciated that in other examples, at least the first dampener 26 may have any cross sectional shape to correspond to the cross sectional shape of the cavity 20.

Figure 10:
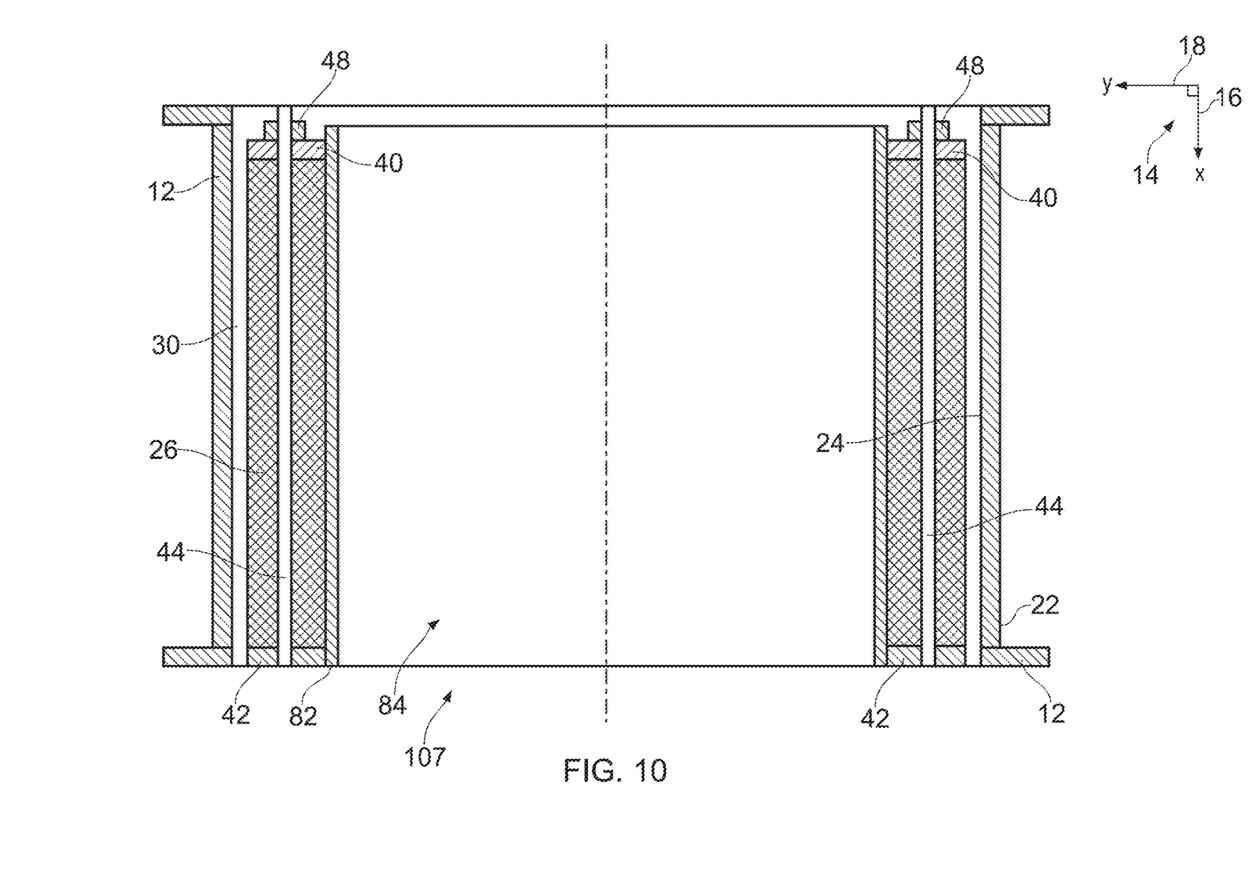
FIG. 10 illustrates a cross sectional plan view of another apparatus for damping machining vibrations according to various examples.
Figure 11:
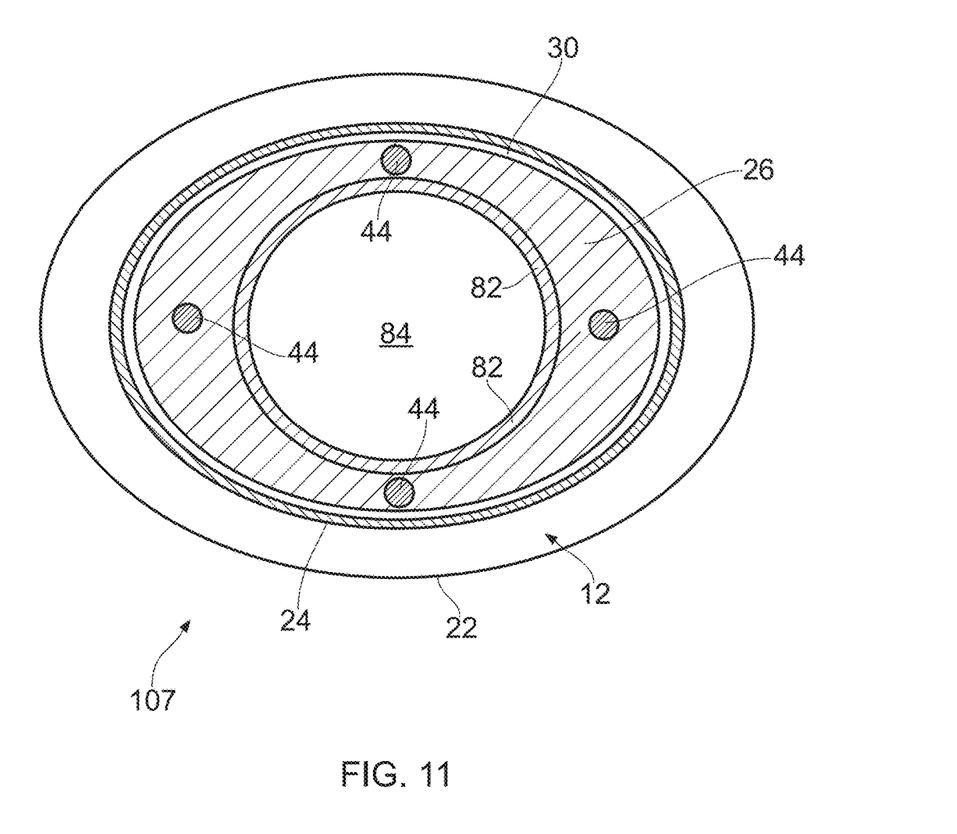
FIG. 11 illustrates a cross sectional front view of the apparatus illustrated in FIG. 10.

FIGS. 10 and 11 illustrate another apparatus 107 for damping machining vibrations. The apparatus 107 is similar to the apparatus 101, 102 illustrated in FIGS. 2 and 3 respectively and where the features are similar, the same reference numerals are used.

The apparatus 107 differs from the apparatus 101, 102 in that the dampener 26, the first pressure member 40, and the second pressure member 42 form cylinders (that is, they each define an annulus when viewed in cross section from the front or rear).

The apparatus 107 includes a rigid member 82. The rigid member 82 may comprise any suitable material and have any suitable shape. For example, the rigid member 82 may comprise a metal and have a cross sectional shape that corresponds to the cross sectional shape of the object 12 to be machined. In some examples, the rigid member 82 may be hollow and define a cavity 84 therein. In other examples, the rigid member 82 may be solid along at least a part of the length of the rigid member.

The dampener 26 is provided around at least a part of the rigid member 82 and is arranged to expand radially outwardly from the rigid member 82 to engage the interior wall 24 of the object 12. The apparatus 107 may include a plurality of elongate members 44 and nuts 48 to enable a user to move the first pressure member 40 in the +X direction and compress the dampener 26 in the X axis 16.

As illustrated in FIG. 10, each of the plurality of elongate members 44 are fixed to the second pressure member 42. In other examples, the apparatus 107 may include a nut 50 for each of the elongate members 44 adjacent the second pressure member 42 to enable the user to move the second pressure member 42 in the −X direction to compress the dampener 26 in the X axis 16.

The apparatus 107 may be advantageous in that the rigid member 82 may enable relatively wide objects (such as casings for gas turbine engines) to be dampened for machining operations.

It will be understood that the invention is not limited to the embodiments above-described and various modifications and improvements can be made without departing from the various concepts described herein.

Except where mutually exclusive, any of the features may be employed separately or in combination with any other features and the invention extends to and includes all combinations and sub-combinations of one or more features described herein.

What is claimed is:

1. An apparatus for damping machining vibrations, the apparatus comprising: a first dampener formed of a viscoelastic material, the first dampener being configured to be inserted into a cavity of an object, the first dampener including an outer surface facing an interior wall of the object and an inner surface; and a compressor configured to compress the first dampener in a first dimension of the first dampener to cause the first dampener to compress in the first dimension and to expand in a second dimension of the first dampener, wherein: when the first dampener is uncompressed in the first dimension, a gap is formed between the outer surface of the first dampener and the interior wall of the object, and when the compressor compresses the first dampener in the first dimension, the first dampener expands in the second dimension such that the outer surface of the first dampener moves towards the interior wall of the object; and no gap is present between an inner surface of the first dampener and the compressor.

2. The apparatus as claimed in claim 1, wherein the viscoelastic material comprises silicone rubber.

3. The apparatus as claimed in claim 1, wherein the first dampener includes a plurality of layers of viscoelastic material.

4. The apparatus as claimed in claim 1, wherein the first dampener includes a circular cross section to engage a cylinder having a corresponding circular cross section.

5. The apparatus as claimed in claim 1, wherein the first dampener includes an elliptical cross section to engage a cylinder having a corresponding elliptical cross section.

6. The apparatus as claimed in claim 1, further comprising a rigid member, the first dampener is provided around at least a part of the rigid member and is arranged to expand in the second dimension outwardly from the rigid member.

7. The apparatus as claimed in claim 6, wherein the rigid member includes a rigid cylinder, the first dampener defines an annulus around the rigid cylinder.

8. The apparatus as claimed in claim 1, wherein the compressor includes first and second pressure members positioned on opposing sides of the first dampener; and an elongate member extending through the first dampener and the first and second pressure members.

9. The apparatus as claimed in claim 8, wherein the elongate member includes a threaded portion, and the compressor further includes a nut to engage the threaded portion of the elongate member and to enable the first and second pressure members to compress the dampener.

10. The apparatus as claimed in claim 8, further comprising a second dampener, the second dampener includes a viscoelastic material, the second dampener is configured to be inserted into the cavity of the object, and the compressor is arranged to provide pressure to the second dampener in the first dimension to cause the second dampener to expand in the second dimension to engage the interior wall of the object.

11. The apparatus as claimed in claim 10, further comprising a spacer member between the first dampener and the second dampener, the spacer member is mounted on the elongate member and is arranged to maintain a predetermined distance between the first dampener and the second dampener.

12. The apparatus as claimed in claim 10, further comprising an absorber between the first dampener and the second dampener, the absorber is mounted on the elongate member and is arranged to absorb vibrations in the elongate member.

13. The apparatus as claimed in claim 1, wherein the object is a shaft of a gas turbine engine.

14. A method of machining an object, the method comprising:
providing the object defining the cavity therein;
inserting the apparatus as claimed in claim 1 at least partially into the cavity of the object; and
controlling the compressor of the apparatus to cause the first dampener to expand in the second dimension such that only the outer surface of the first dampener moves toward the interior wall of the object.

15. The method as claimed in claim 14, further comprising:
causing performance of a machining operation on the object while the apparatus is at least partially positioned within the cavity of the object.

* * * * *